June 7, 1960     H. BULLER     2,939,556

AUTOMATIC THROTTLE CONTROL SYSTEM

Filed May 6, 1957

INVENTOR.
Henry Buller
BY
ATTORNEY

United States Patent Office 2,939,556
Patented June 7, 1960

2,939,556

AUTOMATIC THROTTLE CONTROL SYSTEM

Henry Buller, 390 E. 8th St., New York, N.Y.

Filed May 6, 1957, Ser. No. 657,223

5 Claims. (Cl. 192—3)

This invention relates to throttle controls for automotive vehicles and, more particularly, to an automatic control operable to maintain the engine speed at a value selected by depression of the accelerator pedal and retracted to an inoperative position upon actuation of the brake pedal.

A good deal of today's long distance driving is done on limited access roads, such as thruways, turnpikes, parkways, and the like where speeds of the order of 50 to 70 m.p.h., may be steadily maintained for several hours. As a matter of fact, the safety factor of such driving is greatly increased if all cars are moving at a steady high speed. This is exemplified by the known fact that accidents on such superhighways are usually the result of a car suddenly slowing to a much lower speed and thereby setting up a chain reaction of rear end collisions.

It is very difficult, if not impossible, for a driver to maintain a constant speed of car or engine solely by use of the foot operated accelerator, as any slight change in foot pressure results in a corresponding change in engine speed. These continuing slight changes in speed correspondingly decrease the gas mileage as, every time the accelerator is depressed, a jet in the carburetor shoots extra gas into the engine cylinders.

Another problem on long distance trips on superhighways is that of fatigue. On modern cars equipped with automatic transmissions, all foot operations, except incidental shifting of the headlamp beams or occasional operation of auxiliary devices, are performed by the right foot. On long trips without any stopping for traffic lights, this is true also of cars equipped with standard, manually operable transmissions, as the left foot is used mainly to operate the clutch for shifting. The continual conscious holding of the right foot in a set position results in fatigue of the right leg and foot, with consequent difficulty in maintaining the accelerator pedal in the desired position for constant speed.

While automatic throttle position maintaining devices of different types have been proposed, they have not found commercial acceptance due either to their cost and complication or to the difficulty of installation. For example, known devices have been designed for installation above the engine and beneath the hood. In modern cars, with their numerous engine accessories, the underhood space is severely limited to the point where installation of such automatic throttle controls is difficult, if not impossible, due to the lack of space therefor.

In accordance with the present invention, an automatic throttle control is provided which, when selectively made operative, maintains the throttle control linkage in any position to which it is set by merely depressing the accelerator pedal; and which is instantly rendered ineffective upon operation of the brake pedal. Furthermore, the control is installed directly on the vehicle fire wall and thus does not require space over the engine and under the hood.

More particularly, the throttle control of the present invention comprises a weighted blocking member slidably mounted for vertical movement into operative relation with the throttle linkage. As the accelerator pedal is depressed, this wedge shaped blocking member moves downwardly behind an element of the throttle linkage and retains the linkage in its operated position when the operator removes his foot from the accelerator pedal.

The blocking member is attached to the plunger of a solenoid which, when energized, retracts the blocking member to an inoperative position in which it may be mechanically latched by a latch controlled by a knob or the like on the dash of the vehicle. When this knob is operated to release the latch, it releases a switch to move to the closed position. This switch, which is held open by the knob when the latter is in the blocking member latching position, is in series in a grounding circuit for a relay controlling operation of the solenoid.

One side of this relay is connected to the ungrounded terminal of the vehicle battery. The other side of the relay is connected to one side of the mentioned switch, and the other side of the latter is connected to ground in series with a switch which is closed only when the brake pedal is operated to apply the brakes. This switch may be a convention stop light switch.

Hence, when the brake pedal is depressed, an energizing circuit for the relay is closed. The operation of the relay energizes the solenoid which immediately retracts the blocking member to its inoperative position restoring the throttle linkage to normal manual operation by the accelerator pedal.

For an understanding of the invention principles, reference is made to the following description of a typical embodiment thereof as illustrated in the accompanying drawing. In the drawing.

Figure 1:
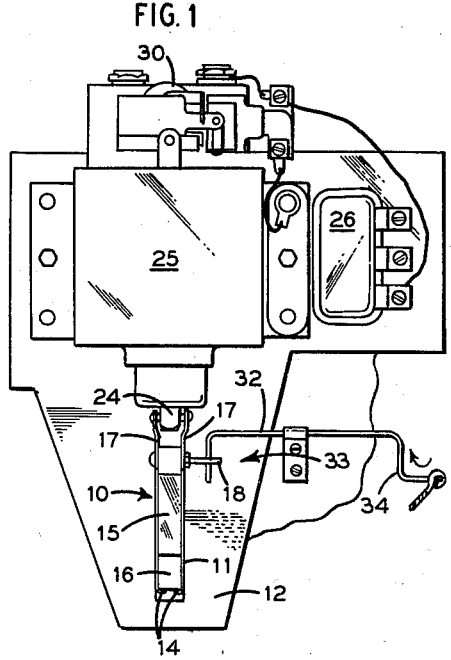
Fig. 1 is a front elevation view of the throttle control of the invention.
Figure 2:
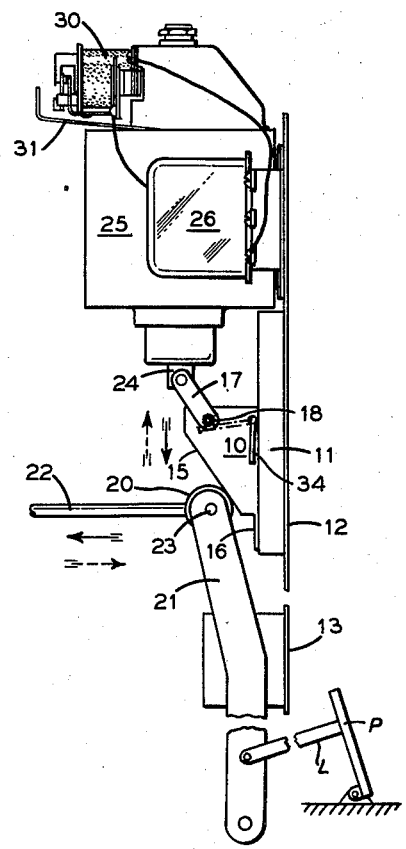
Fig. 2 is a side elevation view thereof.

Referring to Figs. 1 and 2, the automatic throttle control comprises a wedge blocking member 10 mounted for vertical sliding movement in a channel track 11 extending vertically of a mounting plate 12 secured to the fire wall 13 of an automotive vehicle. The lower ends of the flanges of track 11 are bent inwardly as at 14 to limit downward movement of blocking member 10.

Track 11 is mounted in vertically aligned overlapping relation with a pivotally mounted link or lever 21 directly pivotally connected to the accelerator pedal P by a link L for movement in synchronism therewith. The upper end of link 21 is pivotally connected to a rod 22 leading to the carburetor mechanism and, in accordance with the invention, a roller 20 is mounted on the pin 23 connecting lever 21 to rod 22.

Blocking member 10 has a blunt lower nose 16, projecting only slightly from track 11, and a wedge surface 15 extending upwardly and outwardly from nose 16. The height of nose 16 is such that, in the uppermost position of blocking member 10 with nose 16 behind roller 20, the link 21 can move to the throttle closed position without roller 20 engaging nose 16.

Links 17 connect blocking member 10 to the plunger 24 of a solenoid 25 mounted on plate 12 above track 11. The pin 18 connecting links 17 to blocking member 10 projects substantially to one side of the blocking member for a purpose to be described. Energization of solenoid 25 is controlled by a relay 30 having a movable armature 31, the solenoid and relay connections being made from a terminal box 26 on plate 12.

Figure 3:
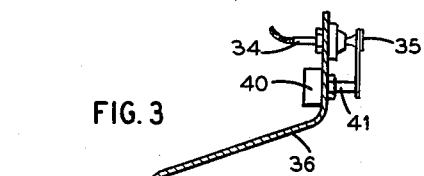
Fig. 3 is a sectional view of the circuit controlling and latch operating means mounted on the dash.

Pin 18 is designed to cooperate with a U-shape latch 32 pivoted in a bracket 33. One end of latch 32 is selectively engageable with pin 18 to hold blocking member 10 in its uppermost and inoperative position. The outer arm of latch 32 is connected by a flexible cable 34 to a knob 35 on the dash 36 of the car (see Fig. 3). By pulling out knob 35, latch 32 is released to drop blocking member 10 into engagement with roller 20.

A switch 40, normally biased to the closed position, is mounted on dash 36 with its operating button behind knob 35. When the knob is pushed in to latch cam 10 in the upper position, button 41 is depressed to open switch 40. When knob 35 is drawn out to release latch 32, switch 40 is biased to the closed position.

The control system is completed by a switch 45, which may be a conventional stop light switch normally biased to the closed position and having a spring biased arm 46 engaged with brake pedal 50. When the brake pedal is not operated, arm 46 is held in a position opening switch 45. As soon as brake pedal 50 is operated, arm 46 is free to swing to a position closing switch 45.

Figure 4:
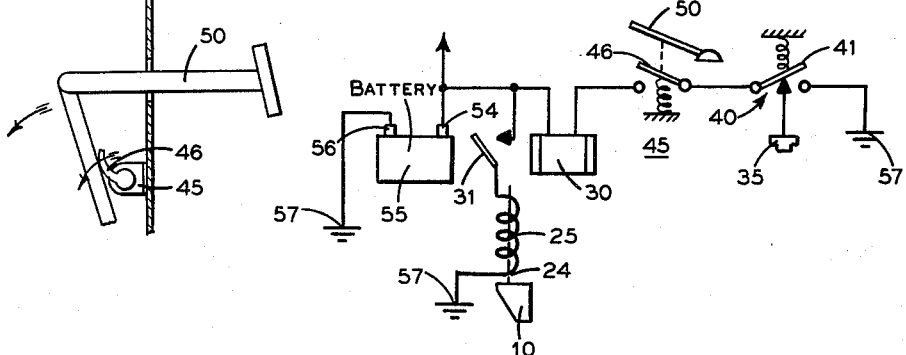
Fig. 4 is a schematic wiring diagram of the throttle control.

The operation of the control will be understood best from reference to Fig. 4. Referring to this figure, one side of relay 30 is connected to the ungrounded terminal 54 of the vehicle battery which has a grounded terminal 56. One side of solenoid 25 is connected to terminal 54 through relay armature 31, and the other side of solenoid 25 is grounded. The other side of relay 30 is connected to ground 57 in series with switches 40 and 45, either of which may be connected to relay 30.

When knob 35 is pulled out to release latch 32, switch 40 is closed and blocking member 10 drops against roller 20. Switch 45 remains open until brake pedal 50 is operated. As the accelerator pedal is depressed, blocking member 10 moves further down with its surface 15 engaging behind roller 20. This holds the linkage 21, 22 in any position to which it is operated by the accelerator pedal and thus maintains the motor speed at the value set by foot operation of the accelerator pedal. The operator can now remove his foot from the accelerator pedal and the vehicle will continue at a steady speed.

Should an increase in speed be desired, it is merely necessary to further depress the accelerator pedal and the vehicle speed will remain constant at the new value.

To render the control inoperative, it is merely necessary to depress brake pedal 50. Switch 45 closes, completing the grounding circuit for relay 30. Armature 31 of relay 30 completes the energizing circuit for solenoid 25, which retracts its plunger 24 to pull blocking member 10 to the upper, retracted position. Blocking member 10 remains retracted as long as brake pedal 50 is depressed. When pedal 50 is released, blocking member 10 drops into operative position where it can be reset by operation of the accelerator pedal.

To cut out the control for any period of time, pedal 50 is depressed and then knob 35 is pushed in, opening switch 40 and operating latch 32. The control remains inoperative until knob 35 is again pulled out.

It will be noted that the described control is mounted on the vehicle fire wall behind the engine, which is highly advantageous due to the control not requiring mounting room over the engine and under the hood, which latter mounting is impractical due to the lack of space over the engine resulting from the use of numerous engine accessories on modern cars.

While a specific embodiment of the invention has been shown and described in detail to illustrate the application of the invention, it will be understood that the invention may be embodied otherwise without departing from such principles.

What is claimed is:

1. An automatic throttle control for an automotive vehicle having a throttle wall having a throttle linkage extending therethrough and connecting an accelerator pedal to the carburetor, and including a pivoted lever connected to the accelerator pedal and extending upwardly along the fire wall, and a rod pivotally connected to the upper free end of said lever and connected to the throttle, said control comprising, in combination, guide means secured along the fire wall in the plane of movement of said lever; a wedge shaped blocking member movable by gravity downwardly along said guide means and having an outwardly inclined surface extending downwardly and toward said fire wall, and engageable with the free end of said lever; said blocking member moving downwardly in engagement with the free end of said lever as said free end is swung away from the fire wall by depression of the accelerator pedal, and in proportion to the amount of movement of the free end of said lever away from the fire wall to block movement of the free end of the lever toward the fire wall as the accelerator pedal is released to retain the throttle linkage in its operated position; and means selectively operable to elevate said blocking member along said guide means to a position disengaging the free end of said lever.

2. An automatic throttle control as claimed in claim 1 including latch means selectively operable to retain the blocking member in said disengaging position.

3. An automatic throttle control as claimed in claim 1 in which said last-named means is operable responsive to actuation of the vehicle brake pedal.

4. An automatic throttle control as claimed in claim 3 in which said last-named means comprises a solenoid means connected to said blocking member; and a normally open energizing circuit for said solenoid means including a switch closed responsive to actuation of the brake pedal.

5. An automatic throttle control as claimed in claim 1 in which said inclined surface engages a roller on the free end of said lever.

References Cited in the file of this patent
UNITED STATES PATENTS

| | | |
|---|---|---|
| 1,721,989 | Dixon | July 23, 1929 |
| 2,509,358 | Krieg | May 30, 1950 |
| 2,742,792 | Lacoste | Apr. 24, 1956 |